US006646075B2

(12) United States Patent
Mao et al.

(10) Patent No.: US 6,646,075 B2
(45) Date of Patent: Nov. 11, 2003

(54) HIGH MOLECULAR WEIGHT PERFLUOROCYCLOBUTANE POLYMERS AND METHOD OF MAKING

(75) Inventors: Shane S. Mao, Woodbury, MN (US); Allen Raymond Siedle, Lake Elmo, MN (US)

(73) Assignee: 3M Innovative Properties Company, Saint Paul, MN (US)

( * ) Notice: Subject to any disclaimer, the term of this patent is extended or adjusted under 35 U.S.C. 154(b) by 168 days.

(21) Appl. No.: 09/726,837

(22) Filed: Nov. 30, 2000

(65) Prior Publication Data

US 2002/0065382 A1 May 30, 2002

Related U.S. Application Data

(60) Provisional application No. 60/171,867, filed on Dec. 23, 1999.

(51) Int. Cl.[7] .............................. C08F 2/00; C08F 14/18
(52) U.S. Cl. ..................... 526/179; 526/177; 526/178; 526/182; 526/233; 526/237; 526/252
(58) Field of Search ................... 526/247, 252, 526/178, 179, 182, 131, 233, 237, 177

(56) References Cited

U.S. PATENT DOCUMENTS

| | | | |
|---|---|---|---|
| 3,418,302 A | * 12/1968 | Darby | |
| 4,337,211 A | 6/1982 | Ezzell et al. | |
| 4,358,412 A | 11/1982 | Ezzell et al. | |
| 4,812,352 A | 3/1989 | Debe | |
| 5,021,602 A | 6/1991 | Clement et al. | |
| 5,023,380 A | 6/1991 | Babb et al. | |
| 5,037,917 A | 8/1991 | Babb et al. | |
| 5,037,918 A | 8/1991 | Babb | |
| 5,037,919 A | 8/1991 | Clement et al. | |
| 5,039,561 A | 8/1991 | Debe | |
| 5,066,746 A | 11/1991 | Clement et al. | |
| 5,159,036 A | 10/1992 | Babb | |
| 5,159,037 A | 10/1992 | Clement et al. | |
| 5,159,038 A | 10/1992 | Babb et al. | |
| 5,162,468 A | 11/1992 | Babb et al. | |
| 5,198,513 A | 3/1993 | Clement et al. | |
| 5,210,265 A | 5/1993 | Clement et al. | |
| 5,246,782 A | 9/1993 | Kennedy et al. | |
| 5,264,508 A | 11/1993 | Ishibe et al. | |
| 5,338,430 A | 8/1994 | Parsonage et al. | |
| 5,364,547 A | 11/1994 | Babb et al. | |
| 5,364,917 A | 11/1994 | Babb et al. | |
| 5,393,852 A | 2/1995 | Ishibe et al. | |
| 5,409,777 A | 4/1995 | Kennedy et al. | |
| 5,426,164 A | 6/1995 | Babb et al. | |
| 5,449,825 A | 9/1995 | Ishibe et al. | |
| 5,620,807 A | 4/1997 | Mussell et al. | |
| 5,879,828 A | 3/1999 | Debe et al. | |
| 5,910,378 A | 6/1999 | Debe et al. | |

FOREIGN PATENT DOCUMENTS

| | | |
|---|---|---|
| WO | WO 97/25369 | 7/1997 |
| WO | WO 99/05126 | 2/1999 |
| WO | WO 99/38842 | 8/1999 |

\* cited by examiner

*Primary Examiner*—Fred Zitomer
(74) *Attorney, Agent, or Firm*—Philip Y. Dahl

(57) ABSTRACT

This invention relates to high molecular weight perfluorocyclobutane polymers and methods of polymerizing trifluorovinyl monomers to form high molecular weight perfluorocyclobutane polymers in the presence of a catalyst or initiator.

24 Claims, No Drawings

HIGH MOLECULAR WEIGHT PERFLUOROCYCLOBUTANE POLYMERS AND METHOD OF MAKING

CROSS-REFERENCE TO RELATED APPLICATION

This application claims priority to U.S. Provisional Patent Application No. 60/171,867 filed on Dec. 23, 1999.

TECHNICAL FIELD

This invention relates to high molecular weight perfluorocyclobutane polymers and methods of polymerizing trifluorovinyl monomers to form such polymers in the presence of a catalyst or initiator.

BACKGROUND

A number of references disclose the thermal polymerization of trifluorovinyl-containing monomers, typically bis-trifluorovinyl monomers, to form perfluorocyclobutylene polymers, including U.S. Pat. Nos. 5,037,917, 5,159,038, 5,364,917, 5,066,746, 5,159,037, 5,023,380, 5,162,468, 5,037,919, 5,198,513, 5,021,602, 5,210,265, 5,037,918, 5,159,036, 5,246,782, 5,409,777, and 5,364,547, the teachings of which are incorporated herein by reference. Disclosed reaction conditions involve heating monomers to temperatures of typically about 150–210° C. for several hours. The resulting polymers "preferably have a molecular weight of from about 300 to about 30,000." (U.S. Pat. No. 5,037,917 at col. 2, ln. 38).

U.S. Pat. Nos. 5,037,918 and 5,159,036 disclose the use of "crosslinking initiating means" on perfluorocyclobutane polymers, subsequent to a completed step of polymerization, to obtain crosslinked polymer gels. Such crosslinking is further described in co-owned U.S. Pat. No. 5,246,782, at col. 3 ln 48—col. 4, ln. 28 and at col. 11, lns. 11–31.

DISCLOSURE OF INVENTION

Briefly, the present invention provides high molecular weight perfluorocyclobutane polymers and methods of polymerizing trifluorovinyl containing monomers to form high molecular weight perfluorocyclobutane polymers in the presence of a catalyst or initiator.

In this document:

"C(number)" refers to a chemical moiety containing the indicated number of carbon atoms; and "substituted" when used without reference to a particular substituent, means substituted by conventional substituents which do not interfere with the desired product or process, e.g., substituents can be alkyl, alkoxy, aryl, phenyl, halo (F, Cl, Br, I), cyano, nitro, etc.

DETAILED DESCRIPTION

The present invention provides high molecular weight perfluorocyclobutane polymers and methods of polymerizing trifluorovinyl containing monomers to form high molecular weight perfluorocyclobutane polymers in the presence of a catalyst or initiator.

Monomers useful in the method of the present invention contain two or more polymerizable trifluorovinyl groups. Monomers are preferably of the formula $CF_2=CF-X-R^1-X-CF=CF_2$, where each —X— is independently selected from the group consisting of: —O—, —S—, —SO—, —SO$_2$—, —CO—, —NH—, and —NR$^2$—, wherein R$^2$ is C1–C25 substituted unsubstituted, saturated or unsaturated alkyl or aryl and R$^1$ is a substituted or unsubstituted C1–C30 aryl or alkyl moiety which may additionally comprise heteroatoms. Preferably X is oxygen. Preferably, R$^1$ is a C1–C16 aryl or alkyl moiety. Suitable monomers disclosed in the background references cited above may be used. Mixtures of monomers may additionally be used. PCFB oligomers or lower molecular weight PFCB polymers can also be used in place of or along with monomers to produce higher molecular weight polymers according to the present invention. Monomers containing three or more polymerizable trifluorovinyl groups may be added to create branch points.

We have found that the use of initiators or catalysts can result in a higher molecular weight polymer. Preferred initiators or catalysts include salts comprising fluorine-containing anions, more preferably anions selected from F$^-$, BF$_4^-$, PF$_6^-$ and SbF$_6^-$, more preferably F$^-$ or PF$_6^-$ and most preferably PF$_6^-$. Useful initiators or catalysts include alkylammonium, alkylsulfonium or alkylphosphonium salts and salts of organometalic complex cations. Preferred initiators or catalysts include alkylammonium salts. Most-preferred initiators or catalysts include (alkyl)$_4$N$^+$PF$_6^-$, wherein the alkyl group is a C1–C8 alkyl group, including (CH$_3$)$_4$N$^+$PF$_6^-$ and (n-C$_3$H$_7$)$_4$N$^+$PF$_6^-$ (available from Aldrich Chemical Co., Milwaukee, Wis.). Without wishing to be bound by theory, it is believed that preferred initiators or catalysts include fluoride generators.

Polymerization involves joining trifluorovinyl groups of different monomer molecules to form linking perfluorocyclobutylene (PFCB) groups. Any suitable reaction conditions and equipment may be used, including batch or continuous processes. Suitable conditions and equipment disclosed in the background references cited above may be used. In addition, the present method has the advantage of allowing the use of lower reaction temperatures.

In the present method, the initiator or catalyst is preferably added to the reaction mixture (comprising monomers, oligomers, or combinations thereof) prior to heating the reaction mixture to reaction temperature or after the reaction mixture reaches reaction temperature, during polymerization. The initiator or catalyst is preferably added to the reaction mixture before it reaches reaction temperature or more preferably before heating. Reaction temperature may be between 100 and 300° C. but is more typically between 120 and 250° C. and preferably 150–200° C. Reaction time is typically 1–24 hours. Solvent may be added. Addition of solvent may improve the activity of the initiator or catalyst by solvating initiator or catalyst.

Crosslinkers or branching agents containing three or more reactive trifluorovinyl groups may be added. Exemplary agents include tris(trifluorovinyloxyaryl)alkanes such as 1,1,1-tris(4'-trifluorovinyloxyphenyl)ethane and others cited in U.S. Pat. Nos. 5,037,918 and 5,159,036, incorporated herein by reference. Preferably the polymer according to the present invention is not crosslinked after polymerization and no crosslinking step is carried out after polymerization.

The resulting polymers have typical weight average molecular weights of two to eight or more times higher than the same polymerization performed without added initiator or catalyst. For comparison, polymers made under typical conditions of about 200° C. for about 72 hours demonstrate typical weight average molecular weights of about 60,000. Preferably polymers of the present invention (made without added crosslinking or branching agents) have a weight average molecular weight (Mw) of 100,000 or greater, more preferably 130,000 or greater, more preferably 160,000 or greater, and most preferably 190,000 or greater.

This invention is useful in the manufacture of high molecular weight PFCB polymers.

Objects and advantages of this invention are further illustrated by the following examples. The particular materials and amounts thereof recited in these examples, as well as other conditions and details, should not be construed to unduly limit this invention.

EXAMPLES

In the examples, all parts, ratios and percentages are by weight unless otherwise indicated. Unless otherwise noted, all chemicals and reagents were obtained or may be available from Aldrich Chemical Co., Milwaukee, Wis.

Example 1C (Comparative)

4,4'-bis(trifluorovinyloxy)biphenyl (described in U.S. Pat. No. 5,037,917, Example 1.)("Monomer A") was added to a covered, glass interior, controlled-temperature reactor, heated to 200° C. and maintained at that temperature for 72 hours under nitrogen atmosphere. The polymer was extracted with THF and precipitated in methanol. The yield was approximately 95 weight percent (wt %). The resulting perfluorocyclobutane (PFCB) arylether polymer had weight average molecular weight (Mw) of 58,000 as measured by GPC in THF solvent using a polystyrene standard.

Example 2

A thermally-controlled vessel was charged with 90 wt % of Monomer A and 10 wt % of (n-propyl)$_4$NPF$_6$ (available from Aldrich Chemical Co., Milwaukee, Wis.). The vessel was brought to 180° C. and maintained at that temperature for 16 hours under nitrogen atmosphere. The polymer was extracted with THF and precipitated in methanol. The yield was again approximately 95 weight percent (wt %). The resulting PFCB arylether polymer had a Mw of 190,000 and a mono-modal molecular weight distribution.

Example 3

The procedure of Example 2 was repeated at a higher reaction temperature of 200° C. The resulting polymer was swellable but mostly insoluble in THF. When the polymer was extracted with THF and precipitated in methanol, a fraction of less than 5 wt % of the total polymer was recovered having a Mw of approximately 190,000. Thus it is concluded that the remainder of the polymer had a Mw of greater than 190,000.

Example 4

The procedure of Example 2 was repeated, replacing (n-propyl)$_4$NPF$_6$ with (methyl)$_4$NPF$_6$ (available from Aldrich Chemical Co., Milwaukee, Wis.). The polymer was extracted with THF and precipitated in methanol. The yield of PFCB arylether polymer was again approximately 95 weight percent (wt %). The polymer had a Mw of 180,000 and a mono-modal molecular weight distribution.

Example 5C (Comparative)

A thermally-controlled vessel was charged with Monomer A and brought to 118° C. and maintained at that temperature for 16 hours under nitrogen atmosphere. The polymer was extracted with THF and precipitated in methanol. The yield was again approximately 95 weight percent (wt %). The resulting PFCB arylether polymer had a Mw of 2,000 and a mono-modal molecular weight distribution.

Example 6

A thermally-controlled vessel was charged with 95 wt % of Monomer A and 5 wt % of [Ir(cyclooctadiene)(triphenylphosphine)$_2$]PF$_6$. The vessel was brought to 118° C. and maintained at that temperature for 16 hours under nitrogen atmosphere. The polymer was extracted with THF and precipitated in methanol. The yield was again approximately 95 weight percent (wt %). The resulting PFCB arylether polymer had a Mw of 16,300 and a mono-modal molecular weight distribution.

Example 7C (Comparative)

A thermally-controlled vessel was charged with Monomer A and brought to 160° C. and maintained at that temperature for 16 hours under nitrogen atmosphere. The polymer was extracted with THF and precipitated in methanol. The yield was again approximately 95 weight percent (wt %). The resulting PFCB arylether polymer had a Mw of 14,700 and a mono-modal molecular weight distribution.

Example 8

A thermally-controlled vessel was charged with 95 wt % of Monomer A and 5 wt % of (n-propyl)$_4$NPF$_6$ (available from Aldrich Chemical Co., Milwaukee, Wis.). The vessel was brought to 160° C. and maintained at that temperature for 16 hours under nitrogen atmosphere. The polymer was extracted with THF and precipitated in methanol. The yield was again approximately 95 weight percent (wt %). The resulting PFCB arylether polymer had a Mw of 46,900 and a mono-modal molecular weight distribution.

Example 9C (Comparative)

A thermally-controlled vessel was charged with Monomer A and brought to 180° C. and maintained at that temperature for 48 hours under nitrogen atmosphere. The polymer was extracted with THF and precipitated in methanol. The yield was again approximately 95 weight percent (wt %). The resulting PFCB arylether polymer had a Mw of 40,000 and a mono-modal molecular weight distribution.

Example 10

A thermally-controlled vessel was charged with 95 wt % of Monomer A and 10 wt % of (Me)$_4$NF (available from Aldrich Chemical Co., Milwaukee, Wis.). The vessel was brought to 180° C. and maintained at that temperature for 48 hours under nitrogen atmosphere. The polymer was extracted with THF and precipitated in methanol. The yield was approximately 90 weight percent (wt %). The resulting PFCB arylether polymer had a Mw of 66,000 and a mono-modal molecular weight distribution.

Various modifications and alterations of this invention will become apparent to those skilled in the art without departing from the scope and principles of this invention. It should be understood that this invention is not to be unduly limited to the illustrative embodiments set forth hereinabove. All publications and patents are herein incorporated by reference to the same extent as if each individual publication or patent was specifically and individually indicated to be incorporated by reference.

We claim:

1. A method of making a perfluorocyclobutane (PFCB) polymer comprising a step of polymerizing a monomer comprising two or more trifluorovinyl groups in the presence of an initiator or catalyst.

2. The method according to claim 1 wherein said initiator or catalyst is selected from the group consisting of salts comprising fluorine-containing anions.

3. The method according to claim 1 wherein said initiator or catalyst is selected from the group consisting of salts comprising anions selected from the group consisting of $F^-$, $BF_4^-$, $PF_6^-$ and $SbF_6^-$.

4. The method according to claim 1 wherein said initiator or catalyst is selected from the group consisting of salts comprising $PF_6^-$ anions.

5. The method according to claim 1 wherein said initiator or catalyst is selected from the group consisting of salts comprising $F^-$ anions.

6. The method according to claim 1 wherein said initiator or catalyst is selected from the group consisting of salts of alkyl- or arylammonium, alkyl- or arylsulfonium, alkyl- or arylphosphonium and organometalic complex cations.

7. The method according to claim 3 wherein said initiator or catalyst is selected from the group consisting of salts of alkyl- or arylammonium, alkyl- or arylsulfonium, alkyl- or arylphosphonium and organometalic complex cations.

8. The method according to claim 3 wherein said initiator or catalyst is selected from the group consisting salts of alkylammonium cations.

9. The method according to claim 1 wherein said initiator or catalyst has the formula $(R)_4N^+PF_6^-$, wherein R is a C1–C8 alkyl group.

10. The method according to claim 1 wherein said initiator or catalyst is $(CH_3)_4N^+PF_6^-$.

11. The method according to claim 1 wherein said initiator or catalyst is $(n\text{-}C_3H_7)_4N^+PF_6^-$.

12. The method according to claim 1 wherein said initiator or catalyst is $(CH_3)_4N^+F^-$.

13. The method according to claim 1 wherein said monomer is selected from the group consisting of monomers of the formula $CF_2=CF-X-R^1-X-CF=CF_2$,
wherein each —X— is independently selected from the group consisting of: —O—, —S—, —SO—, —SO$_2$—, —CO—, —NH—, and —NR$_2$—, wherein each $R^2$ is independently selected from C1–C25 substituted or unsubstituted, saturated or unsaturated alkyl or aryl;
wherein $R^1$ is a substituted or unsubstituted C1–C30 aryl or alkyl moiety which may additionally comprise heteroatoms.

14. The method according to claim 13 wherein —X— is —O—.

15. The method according to claim 13 wherein $R^1$ is a C1–C16 aryl or alkyl moiety.

16. The method according to claim 1 wherein said monomer includes 4,4'-bis(trifluorovinyloxy)biphenyl.

17. The method according to claim 3 wherein said monomer is selected from the group consisting of monomers of the formula $CF_2=CF-X-R^1-X-CF=CF_2$,
wherein each —X— is independently selected from the group consisting of: —O—, —S—, —SO—, —SO$_2$—, —CO—, —NH—, and —NR$_2$—, wherein each $R^2$ is independently selected from C1–C25 substituted or unsubstituted, saturated or unsaturated alkyl or aryl;
wherein $R^1$ is a substituted or unsubstituted C1–C30 aryl or alkyl moiety which may additionally comprise heteroatoms.

18. The method according to claim 17 wherein —X— is —O—.

19. The method according to claim 17 wherein $R^1$ is a C1–C16 aryl or alkyl moiety.

20. The method according to claim 3 wherein said monomer includes 4,4'-bis(trifluorovinyloxy)biphenyl.

21. The method according to claim 7 wherein said monomer is selected from the group consisting of monomers of the formula $CF_2=CF-X-R^1-X-CF=CF_2$,
wherein each —X— is independently selected from the group consisting of: —O—, —S—, —SO—, —SO$_2$—, —CO—, —NH—, and —NR$_2$—, wherein each $R^2$ is independently selected from C1–C25 substituted or unsubstituted, saturated or unsaturated alkyl or aryl;
wherein $R^1$ is a substituted or unsubstituted C1–C30 aryl or alkyl moiety which may additionally comprise heteroatoms.

22. The method according to claim 21 wherein —X—is —O—.

23. The method according to claim 21 wherein $R^1$ is a C1–C16 aryl or alkyl moiety.

24. The method according to claim 7 wherein said monomer includes 4,4'-bis(trifluorovinyloxy)biphenyl.

* * * * *

UNITED STATES PATENT AND TRADEMARK OFFICE
CERTIFICATE OF CORRECTION

PATENT NO. : 6,646,075 B2
DATED : November 11, 2003
INVENTOR(S) : Mao, Shane S.

It is certified that error appears in the above-identified patent and that said Letters Patent is hereby corrected as shown below:

Column 1,
Line 67, "substituted unsubstituted" should be -- substituted or unsubstituted --

Column 5,
Line 36, "$NR_2$" should be -- $NR^2$ --

Column 6,
Lines 12 and 28, "$NR_2$" should be -- $NR^2$ --

Signed and Sealed this

Tenth Day of August, 2004

JON W. DUDAS
*Acting Director of the United States Patent and Trademark Office*